(12) United States Patent
Al-Omari et al.

(10) Patent No.: US 8,799,272 B2
(45) Date of Patent: Aug. 5, 2014

(54) DATA SKEW INSENSITIVE PARALLEL JOIN SCHEME

(75) Inventors: Awny K. Al-Omari, Cedar Park, TX (US); QiFan Chen, Austin, TX (US); Gregory S. Battas, Fishers, IN (US); Kashif A. Siddiqui, Austin, TX (US); Michael J. Hanlon, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 693 days.

(21) Appl. No.: 11/780,843

(22) Filed: Jul. 20, 2007

(65) Prior Publication Data

US 2009/0024568 A1    Jan. 22, 2009

(51) Int. Cl.
*G06F 17/30* (2006.01)
(52) U.S. Cl.
USPC ......................................... 707/718
(58) Field of Classification Search
CPC ............... G06F 17/30595; G06F 17/30445; G06F 17/30442; G06F 17/30463
USPC ............................. 707/2, 718, 705
See application file for complete search history.

(56) References Cited

U.S. PATENT DOCUMENTS

| | | | | |
|---|---|---|---|---|
| 5,121,494 A | * | 6/1992 | Dias et al. ........................ | 707/2 |
| 5,873,074 A | * | 2/1999 | Kashyap et al. ................. | 707/2 |
| 5,978,793 A | | 11/1999 | Gerber et al. | |
| 5,987,468 A | * | 11/1999 | Singh et al. ................... | 707/100 |
| 6,112,198 A | | 8/2000 | Pirahesh et al. | |
| 2009/0248617 A1 | * | 10/2009 | Molini .............................. | 707/2 |

OTHER PUBLICATIONS

European Patent Office, European Search Report, Oct. 12, 2009, 9 Pages.
Joel L Wolf et al, New Algorithms for Parallelizing Relational Database Joins in the Presence of Data Skew, IEEE Transactions on Knowledge and Data Engineering, vol. 6 No. 6.
Ron-Chung Hu et al, Removing Skew Effect in Join Operation on Parallel Processors, Report UCLA Computer Science, Department, Jun. 1, 1989, pp. 1-24, XP000351622.
Kien A Hua et al, Dynamic Load Balancing in Multicomputer Database Systems Using Partition Tuning, IEEE Transactions on Knowledge and Data Engineering, vol. 7 No. 6, Dec. 1995.

* cited by examiner

*Primary Examiner* — Yuk Ting Choi

(57) ABSTRACT

A method for creating a joined data set from a join input data set is disclosed. The method starts by categorizing the join input data set into a high-skew data set and a low-skew data set. The low-skew data set is distributed to the plurality of CPUs using a first distribution method. The high-skew data set is distributed to the plurality of CPUs using a second distribution method. The plurality of CPUs process the high-skew data set and the low-skew data set to create the joined data set.

15 Claims, 6 Drawing Sheets

Data from Table A

Partition By Join Column
*Partition uniformly*

Data from Table B

Partition By Join Column
*Replicate to all*

DATA SKEW INSENSITIVE PARALLEL JOIN SCHEME

BACKGROUND

In Massively Parallel Processing (MPP) systems, Business Intelligence (BI) and Enterprise Data Warehouse (EDW) applications process massive amounts of data. The data (a set of relational tables) resides in very large database systems that rely on a large number of central processing units (CPU) to efficiently execute database operations. MPP systems apply the divide-and-conquer approach of evenly distributing the data among the available processors and then performing the intended operation in parallel, instead of performing the operation serially.

One of the basic and most common database operations is the join between two relational tables. The join operator combines the records from both tables based on a matching criterion between columns in the tables. For example, the table LINEITEM can be joined to table PRODUCT by matching product_id columns on both tables to get a set of all line items with their product information. The join operation is often the most computationally expensive operation in the query execution tree, and its performance dictates the overall performance of the query.

To perform the join operation efficiently in parallel, the system partitions the data stream from both tables based on the value of the join column (product_id in the example above). That is, all records that have the same value of the join column from either table, or child, of the join are guaranteed to be sent to the same central processing unit (CPU). Hence, all join matches can be found locally in each CPU and independently of the other CPUs.

FIG. 1 is a block diagram of how the join operation is parallelized using a partition-by-value scheme. Data from both sides of the join (Table A and Table B along the bottom of FIG. 1) is read and redistributed to the n join instances (along the top of FIG. 1). Each join instance is running as part of an Executor Server Process (ESP) hosted on a separate CPU in the MPP system. The data is repartitioned based on the value of the join column(s) to ensure the correctness of the parallel join result. Specifically, the hash value of the join column(s) is used to select the join instance.

This partition-by-value scheme works well when records are distributed uniformly. The use of a good hash function ensures that distinct values are distributed uniformly (or pseudo-randomly) to all processors. However, a good hash function does not guarantee that records are distributed evenly since not all distinct values have the same occurrence frequency in the data set. The problem becomes evident when one value has an occurrence frequency higher than the average number of records per CPU. This is called data skew or skew. In the case of such data skew, the CPU selected by the frequent value will process a significantly higher number of records than average, which would significantly degrade the query response time.

The effect of skew on the partition-by-value scheme is demonstrated by FIG. 2. FIG. 2 is a block diagram of the location of the column values in the join instances after a partition-by-value distribution. Values from both sides of the join (Table A and Table B) are hashed to one of 128 parallel join instances (Join 0-Join 127). For demonstration purpose the simple hash function of [hash(v)=v mod 128] is used. All join column values, except for v=1, are uniformly distributed and hence their corresponding rows are uniformly partitioned (i.e. each join instance has approximately the same number of join column values). The value of v=1, on the other hand, has very high frequency. Since all rows with v=1 are sent to the second join instance, the second join instance will process considerably more rows than other join instances in the scheme. This is regardless of the quality of the hash function used. Because the second join instance has considerably more rows than other join instances in the scheme, it will take longer for the second join instance to complete its processing.

Data skew is inherent in certain types of data (e.g. 40% of a sales table records have country_id='United States'), or could result from the data collection process (e.g. 20% of the sales table records have customer id='Unknown'). In either case the database system must be capable of performing efficient queries on such data. The skew problem is exceptionally important for MPP systems because the larger the system is, the more likely it will suffer from data skew problems. For example, a value that occurs in 11% of the records of a large table will slow down its join operations on an 8-way system by 2×, while the same task will slow down by 30× on a 256-way MPP system.

DETAILED DESCRIPTION

FIG. 3-FIG. 6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

To avoid the severe performance degradation that results from the partitioning of skewed data, a skew-insensitive parallel join scheme has been devised. In contrast to the partition-by-value scheme which partitions all data to CPUs based on the values of the join column(s), the parallel join scheme uses the column values to partition only the records that have non-skewed values, while using a different distribution scheme to uniformly distribute records with skewed values.

In one example embodiment of the invention, the first step is to categorize the data into a high-skew data set and a low-skew data set. A different distribution scheme is applied to each data set. The high-skew data set consists of any row in the join input data that has a join column value with relatively high occurrence frequency. The low-skew data set consists of the rest of the rows. The parallel join scheme handles low-skew data in a manner identical to the partition-by-value scheme, i.e. data is redistributed based on the hash values of the join column(s) on both side of the join operator. High-skew data is handled differently than the low-skew data.

Figure 3:
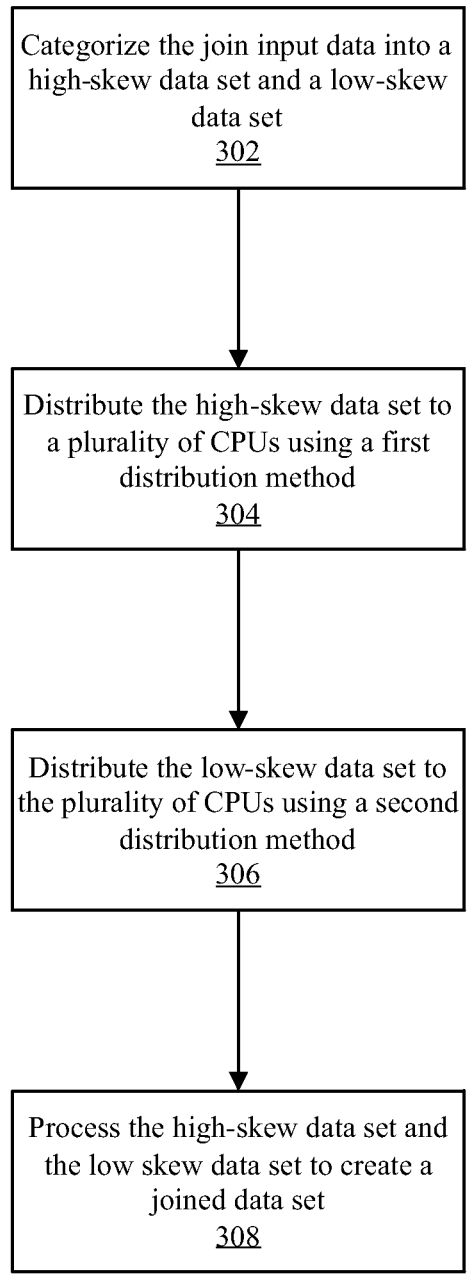
FIG. 3 is a flow chart for a parallel join scheme in an example embodiment of the invention.

FIG. 3 is a flow chart for a parallel join scheme in an example embodiment of the invention. At step 302 the join input data is categorized into a high-skew data set and a low-skew data set. At step 304 the high skew data set is distributed to a plurality of CPUs using a first distribution method. At step 306 the low skew data set is distributed to the plurality of CPUs using a second distribution method. At step 308 the high skew data set and the low skew data set are processed by the plurality of CPUs to create a joined data set.

In the following discussion it is assumed that the data skew is occurring at only one side of the join, which will be referred to as the skewed side. It should be noted, however, that the algorithm is equally applicable to cases when the skew is occurring at both sides of the join as will be shown later.

In one example embodiment of the invention, the parallel join scheme handles the high-skew data set as follows. At the skewed side of the join, rows that belong to the high-skew set are distributed to the join instances using a uniform distribution scheme, for example round robin or random. On the non-skewed side of the join, rows that match the high-skew set are replicated to all join instances. By uniformly distributing the high-skew data set from the skewed side, the algorithm achieves uniform distribution of tasks to the join instances. By replicating the matching rows from the non-skewed side of the join, it ensures that these rows will be present in any join instance selected by the uniform distribution of the corresponding rows from the skewed side. The additional cost of data replication is small since the algorithm only replicates matching rows on the non skewed side.

Figure 1:
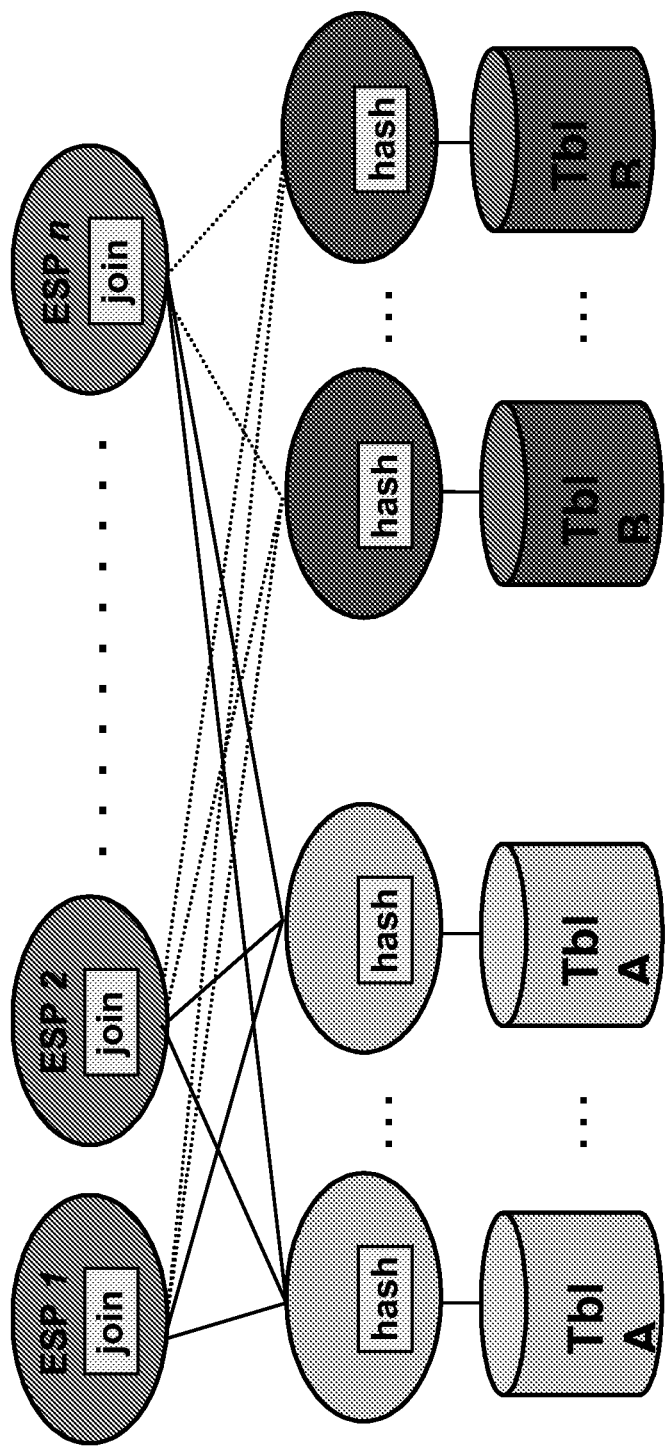
FIG. 1 is a block diagram of how the join operation is parallelized using a partition-by-value scheme.
Figure 2:
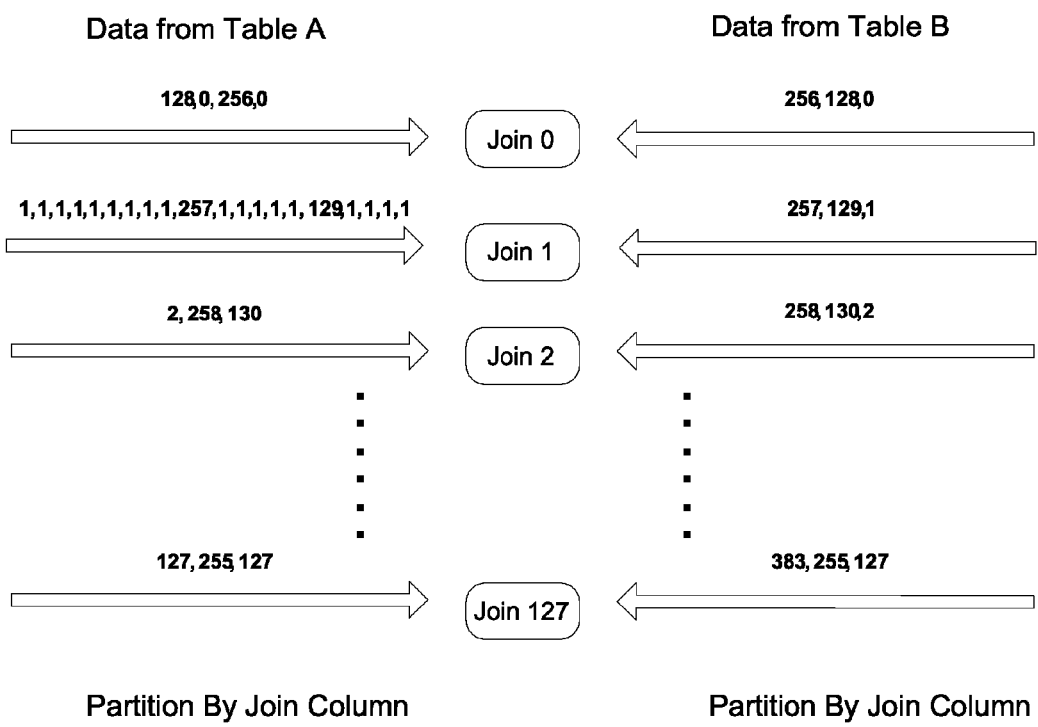
FIG. 2 is a block diagram of the location of column values in the join instances after a partition-by-value distribution.
Figure 4:
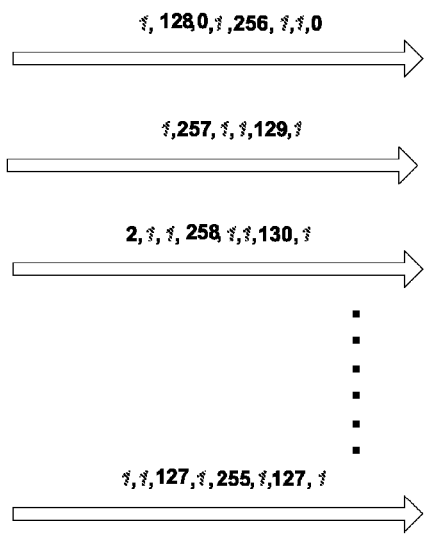
FIG. 4 is a block diagram of the location of column values in the join instances after a parallel join distribution in an example embodiment of the invention.
Figure 4:
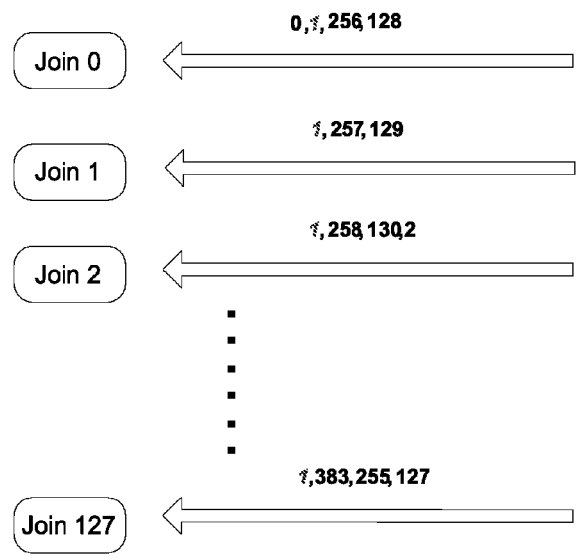

The application of the parallel join scheme to joins on skewed values is demonstrated in FIG. 4. This is the identical join example as the one presented earlier (FIG. 2) with the exception that the parallel join scheme has been used. Data that is not highly skewed (i.e. all values except for v=1) is partitioned evenly in the same manner as in FIG. 2. Skewed values (i.e. v=1, shown in light grey) are distributed differently. The skewed values on the left side of the join are uniformly distributed among all join instances. The matching rows on the right side of the join (in this case one row) are replicated to all join instances.

In one example embodiment of the invention, the parallel join scheme has two components; skewed value detection and skewed value processing. First, the query optimizer examines each join operator in the query plan to determine the high-skew data sets. Second, at query execution time, both high-skew and low-skew data sets are distributed and processed in a manner that achieves task uniformity among the processing units with minimal overhead.

Skewed values detection may be performed in the query optimization phase. Detecting skew during the query optimization phase, instead of at runtime, creates a number of advantages. Detecting skew during the query optimization phase eliminates runtime false alarms such as data being temporally skewed as a result of sort order or partial sort order. Such order may also prevent or delay skew detection at runtime if the skewed values appeared late in the sort order. Detecting skew during the query optimization phase also allows for a single set of join instances, without the need to re-route records across the join instances. Detecting skew during the query optimization phase allows better pipelining because the operators know what to do in advance. When skew is determined during runtime, expensive recovery steps are required when skew is detected.

The query optimizer relies on table statistics for estimating row cardinality and cost of each operator in the query execution plan. Statistics are gathered after data load or whenever the data in the tables has changed substantially via insert, update, or delete operations. Statistics may be stored in metadata tables and retrieved at query compile time by the optimizer. In order to enable the optimizer to detect skewed values, the statistics gathering operation needs to capture and store all column values that have high occurrence frequencies. We will refer to these values as the most frequent values (MFVs). The corresponding frequencies of the MFVs need to be captured as well.

At compile time, the query optimizer retrieves the table column statistics, including the list of MFVs and their frequencies, for all columns that are involved in any join predicate in the query. During the optimization process, the optimizer propagates this list, as part of the column statistics, and adjusts it throughout the query plan tree. Since a join may occur between intermediate query results as well as base tables, it is necessary to compute the MFVs frequencies at each step in the join tree. The join result frequency for a value, v, is simply:

$$\text{Join Frequency}(v) = \text{Child1 Frequency}(v) \times \text{Child2 Frequency}(v)$$

The total join result cardinality is also computed using the statistics from both of the join children.

Once the total cardinality and frequencies of the MFVs are computed for the join and its children, the optimizer proceeds in computing the skewed values list (SVL) for each of the join children. The SVL is a subset of the MFVs with occurrence frequencies exceeding a certain threshold, which will be referred to as the skew sensitivity threshold (SST). The threshold may be chosen such that values over the threshold are the only values capable of significantly distorting the uniform data distribution.

In one example embodiment of the invention, the skew sensitivity threshold (SST) for a join child is calculated as approximately the child cardinality divided by the number of CPUs the data will be distributed to. In another example embodiment of the invention, the skew sensitivity threshold is calculated as SST=(CC/#CPU)*X where SST is the skew sensitivity threshold, CC is the child cardinality, #CPU is the number of CUPs the data will be distributed to, and X is an adjustment factor. The adjustment factor X can be set as a fractional value to reduce the skew sensitivity threshold, thereby causing more data to be selected as skewed. The adjustment factor X can be set as a value larger than one to increase the skew sensitivity threshold, thereby causing less data to be selected as skewed. The number of such skewed values cannot exceed a few hundred and, hence, can be easily stored and retrieved with minimal overhead. Similarly the SVL for a join child can be chosen as the subset of the child MFVs that has join result frequency exceeding a fraction of the total join result cardinality divided by the number of CPUs the data will be distributed to.

After computing the skew value list for child1, SVL1, and child2, SVL2; the two lists are compared for overlap elimination. Even though overlap between the two lists is extremely rare, this step is necessary since the decision of whether to uniformly distribute or replicate a row will depend on which list it belongs to. Failure to do this may result in incorrect join results. If a certain value is found in both SVL1 and SVL2, the value is removed from the list in which the value has lower frequency. The step of removing a duplicate value from one table will be referred to as reconciling SVL1 and SVL2.

Figure 5:
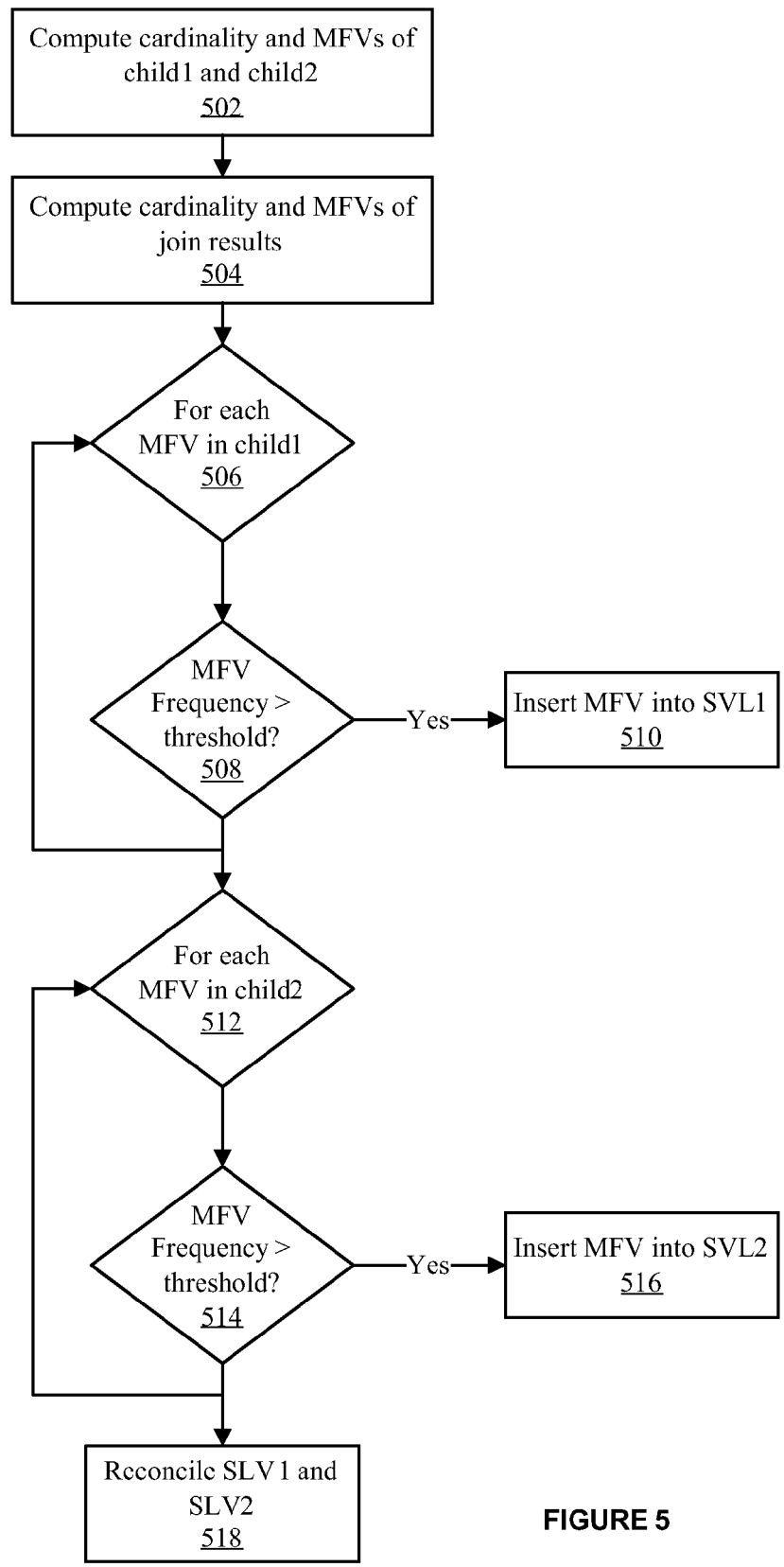
FIG. 5 is a flow chart illustrating one embodiment used for creating the skewed value list for child1 and child2 (SVL1 and SVL2) in an example embodiment of the invention.

FIG. 5 is a flow chart illustrating one embodiment for creating the skewed value list for child1 and child2 (SVL1 and SVL2) in an example embodiment of the invention. At step 502 the cardinality and most frequent values of child1 and child2 are computed. At step 504 the cardinality and most frequent values of the join results are computed. At step 506 a loop occurs where each most frequent value (MFV) in child1 is examined. At step 508 the occurrence frequency of each MFV is compared to a threshold. When the occurrence frequency of the MFV is greater than the threshold the MFV is inserted into the first skewed value list (SVL1) in step 510. When the occurrence frequency of the MFV is less than the threshold flow returns to step 506. After each MFV in child1 has been examined, flow continues at step 512. At step 512 a loop occurs where each most frequent value (MFV) in child2 is examined. At step 514 the occurrence frequency of each MFV is compared to a threshold. When the occurrence frequency of the MFV is greater than the threshold the MFV is inserted into the second skewed value list (SVL2) in step 516. When the occurrence frequency of the MFV is less than the threshold flow returns to step 512. After each MFV in child2 has been examined, flow continues at step 518. In step 518 SLV1 and SLV2 are reconciled.

When choosing the plan for a particular join, the optimizer will examine the statistics for each of the join children. The optimizer will choose the standard partition-by-value scheme if statistics show no significant skew (i.e. both SVL1 and SVL2 are empty). On the other hand if skew is detected (i.e. either SVL1 or SVL2 is not empty), then the optimizer will insert a special distribution operator between the join and each of its children. Without loss of generality let us assume that the skewed values are detected on the left child. The left child skew list, SVL1, is then propagated to the left distribution operator as a list of special values to be uniformly distributed using a random or round-robin approach. The same list is also communicated to the right distribution operator as special values to be replicated to all CPUs. As stated earlier, the number of skewed values is relatively small. If skew was also detected on the right child of the join, then SVL2 will be propagated to the right distribution operator for uniform distribution and to the left operator for replication.

The processing of skewed values at runtime is performed by the special distribution operators introduced during skew detection. Following the conventions used in skew detection, the operator on the left side of the join treats the values from SVL1 as skewed values from its side, and those in SVL2 as values that are matched by skewed values from the right side. Conversely, the distribution operator on the right side treats the values in SVL2 as skewed values from its side, and values from SVL1 as values that match skewed values on the left side.

In many BI applications, skewed values will be found on only one side of the join. For example, a join column might be customer id, joining a large fact table, ORDERS, where 20% of the rows have the value 'Unknown', but only one row in the dimension table CUSTOMER has that matching value. In this case the distribution operator on the left, which by convention processes the larger table, need be concerned only with skewed values from its own side of the join. The distribution operator on the right side need be concerned only with skewed values from the other side of the join.

Assuming skewed values are detected only on the left side of the join, the runtime handling of skewed and non-skewed values is as follows. The left distribution operator builds a hash table of the skewed values from SVL1. When handling an incoming record, the join column value is checked using this hash table. If the value is found then the record is sent to any of the CPUs using a uniform distribution scheme, for example round-robin or random. In this way, these rows are evenly distributed despite their skewed partitioning values. If the value is not found among the skewed values then the record is sent to the CPU assigned for this particular value based on the standard partition-by-value scheme. The overhead of detecting whether the row has a skewed value is minimal because the intermediate hash value obtained in the standard hashing scheme is used. The hash table is built such that non-skewed rows can be confirmed with one hash-table probe. The cost of detecting skewed rows can be easily controlled by increasing the size of the hash table as needed (recall that the number of skewed values cannot exceed a few hundred).

Similarly, the right distribution operator builds a hash table of the same set of skewed values, SVL1. In this case however, records that have values matching skewed values from the hash table are replicated to all CPUs. In one example embodiment of the invention, this is necessary because the matching records on the left side were not partitioned-by-value but rather uniformly distributed and, hence, the right child distribution operator has no knowledge of the location of the matching records. In another example embodiment of the invention, the location of the matching records from the left side may be sent to the right child distribution operator. When the location is sent to the right child distribution operator, the records that have values matching skewed values from the hash table are replicated only to the CPU that received the skewed value. As on the left, rows that have no matches in the skewed values table are partitioned based on the standard partition-by-value scheme. These records will find their matches since the matching left child records were partitioned identically.

In cases where skew is found on both left and right sides of the join, each distribution operator can build two hash tables: one for the skewed values from its side of the join (for the left side this is SVL1 and for the right side this is SVL2) and one for the skewed values from the other side (SVL2 for left, SVL1 for right). Then each distribution operator checks incoming rows against the table of its own side's skewed values and uniformly distributes those matching. Otherwise, the record is checked against the table of skewed values from the other side and the matches are replicated. Unmatched rows are distributed based on the join column(s) values. The handling of skew on both sides of the join is illustrated in FIG. 6.

Figure 6:
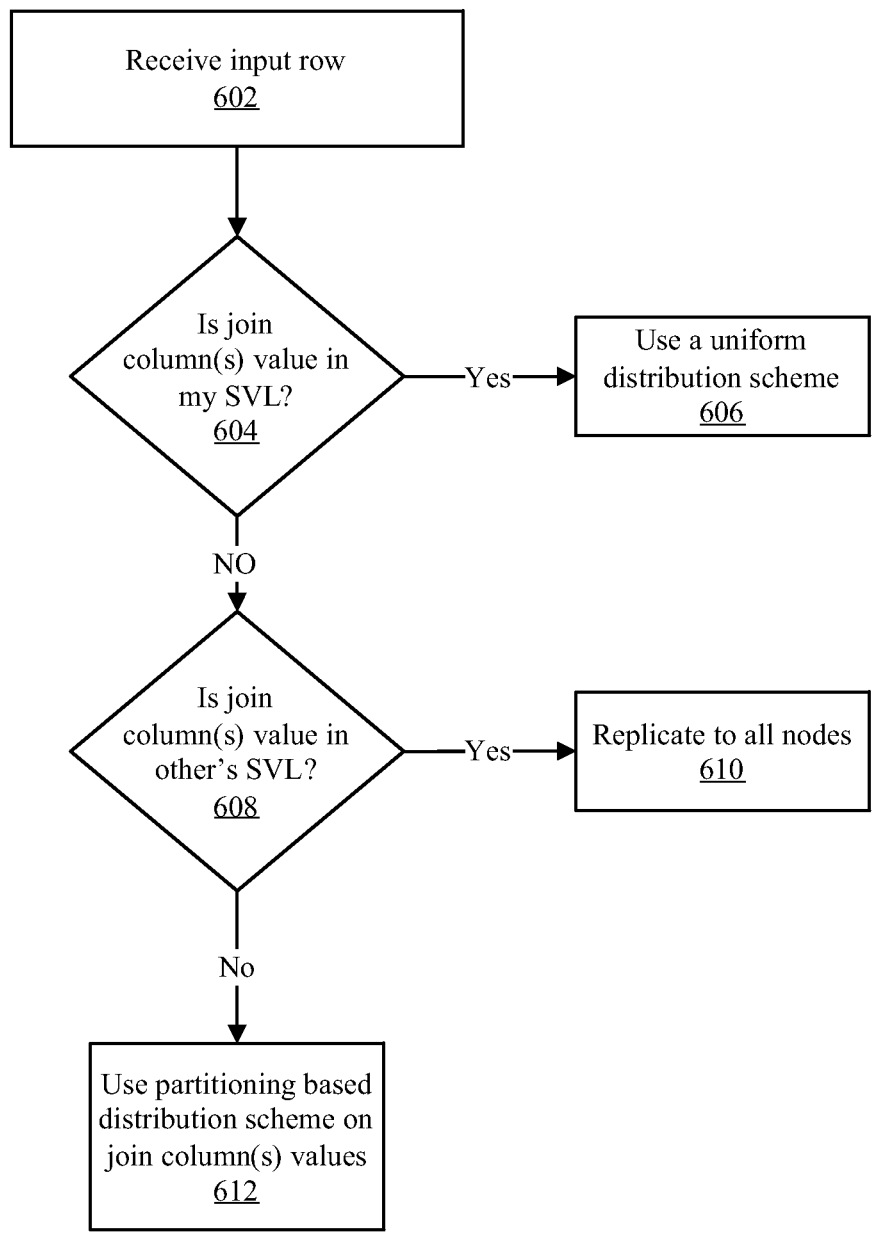
FIG. 6 is a flow chart illustrating one embodiment used for distributing row data to the different join instances with skew on both sides of the join in an example embodiment of the invention.

FIG. 6 is a flow chart illustrating one embodiment for distributing row data to the different join instances with skew on both sides of the join in an example embodiment of the invention. At step 602 the input row is received. At step 604 the skewed value list (SVL) for the current side is searched to determine if the column(s) value is present. When the column (s) value is present, the column value is distributed to one of the CPUs using a uniform distribution scheme in step 606. When the column(s) value is not present, flow continues to step 608. At step 608 the skewed value list (SVL) for the other side is searched to determine if the column(s) value is present. When the column(s) value is present, the column value is replicated to all join instance or nodes in step 610. When the column(s) value is not present, flow continues to step 612. At step 612 the column(s) value is distributed to a CPU using a partitioning based distribution scheme.

What is claimed is:

1. A data-processing system comprising:
    a hardware platform that includes two or more processors; and a database-management system that executes a join operation, carried out on two tables R and S that each has rows with one or more join-attribute values, on the two or more processors by on each processor, executing a first portion of the join operation by joining a first subset of the rows of table R, the join-attribute-value distribution of which is skewed above a skew threshold and which have been distributed among the two or more processors by a first distribution method, with a first subset of the rows of table S; and executing a second portion of the join operation by joining a second subset of the rows of table R, the join-attribute-value distribution of which is not skewed or is skewed below a threshold value and which have been distributed among the two or more processors by a second distribution method, with a second subset of the rows of table S;

in which the skew threshold is determined by dividing an operator cardinality by the number of processors used during the join operations, deriving a quotient there from, and multiplying the derived quotient by an adjustment factor.

2. The data-processing system of claim 1 wherein the first subset of the rows of table S are replicated and distributed to each of the two or more processors.

3. The data-processing system of claim 1 further including:
on each processor,
executing a third portion of the join operation by joining a third subset of the rows of table S, the join-attribute-value distribution of which is skewed above a skew threshold and which have been distributed among the two or more processors by the first distribution method, with a third subset of the rows of table R.

4. The data-processing system of claim 3 wherein the first subset of the rows of table S are replicated and distributed to each of the two or more processors.

5. The data processing system of claim 1 wherein the first distribution method is one of:
a partitioning-based distribution method in which rows are partitioned based on the one or more attribute values exclusive of the one or more join-attribute values;
a round-robin distribution; and
random distribution.

6. The data-processing system of claim 1 wherein the second distribution method is one of:
hash distribution based on hashing the one or more join-attribute values; and
a partitioning-based distribution method in which rows are partitioned based on the one or more join-attribute values.

7. A database-management system, encoded as computer instructions in a non-transitory computer-readable medium, that that executes a join operation, carried out on two tables R and S that each has rows with one or more join-attribute values, on the two or more processors by:
joining a first subset of the rows of table R, the join-attribute-value distribution of which is skewed above a skew threshold and which have been distributed among the two or more processors by a first distribution method, with a first subset of the rows of table S; and
joining a second subset of the rows of table R, the join-attribute-value distribution of which is not skewed or is skewed below a threshold value and which have been distributed among the two or more processors by a second distribution method, with a second subset of the rows of table S;
in which the skew threshold is determined by dividing an operator cardinality by the number of processors used during the join operations, deriving a quotient there from, and multiplying the derived quotient by an adjustment factor.

8. The database-management system of claim 7 wherein the first subset of the rows of table S are replicated and distributed to each of the two or more processors.

9. The database-management system of claim 7 further including:
joining a third subset of the rows of table S, the join-attribute-value distribution of which is skewed above a skew threshold and which have been distributed among the two or more processors by the first distribution method, with a third subset of the rows of table R.

10. The database-management system of claim 9 wherein the first subset of the rows of table S are replicated and distributed to each of the two or more processors.

11. The database-management system of claim 7 wherein the first distribution method is one of:
a partitioning-based distribution method in which rows are partitioned based on the one or more attribute values exclusive of the one or more join-attribute values;
a round-robin distribution; and
random distribution.

12. The database-management system of claim 7 wherein the second distribution method is one of:
hash distribution based on hashing the one or more join-attribute values; and
a partitioning-based distribution method in which rows are partitioned based on the one or more join-attribute values.

13. In a computing system having a plurality of interconnected central processing units (CPUs) and a memory storing a join input data set, a method for creating a joined data set, the steps of the method comprising:
categorizing the join input data set into a high-skew data set and a low-skew data set during a query optimization phase;
at query execution time, distributing the low-skew data set to the plurality of CPUs using a first distribution method;
at query execution time, distributing the high-skew data set to the plurality of CPUs using a second distribution method wherein the first distribution method is different from the second distribution method; and
wherein the plurality of CPUs process the high-skew data set and the low-skew data set to create the joined data set:
wherein the high-skew data set is categorized by comparing an occurrence frequency of a join column value to a threshold value; and
wherein a skew threshold is used to determine if an input data set is categorized as a high-skew data set, the skew threshold being determined by dividing an operator cardinality by the number of processors used during the join operations, deriving a quotient there from, and multiplying the derived quotient by an adjustment factor.

14. The method of claim 13, wherein the skew threshold value is calculated as TV=(OC/#CPU)*X where TV is the threshold value, OC is the operator cardinality, #CPU is the number of CPUs the data will be distributed to, and X is an adjustment factor.

15. The method of claim 13, wherein categorizing the join input data set further comprises:
computing a cardinality and a set of most frequent values (MFV1) for a child1 of the join;
computing a cardinality and a set of most frequent values (MFV2) for a child2 of the join;
computing a cardinality and a set of most frequent values for a join result;

comparing an occurrence frequency of each of the MFV1 to a threshold;
when the occurrence frequency is greater than the threshold inserting the MFV1 into a first skewed value list (SVL1);
comparing an occurrence frequency of each of the MFV2 to a threshold; and
when the occurrence frequency is greater than the threshold inserting the MFV2 into a second skewed value list (SVL2);
reconciling SVL 1 with SVL2.

* * * * *

UNITED STATES PATENT AND TRADEMARK OFFICE
CERTIFICATE OF CORRECTION

| | |
|---|---|
| PATENT NO. | : 8,799,272 B2 |
| APPLICATION NO. | : 11/780843 |
| DATED | : August 5, 2014 |
| INVENTOR(S) | : Awny K. Al-Omari et al. |

It is certified that error appears in the above-identified patent and that said Letters Patent is hereby corrected as shown below:

In the Claims

In column 7, line 36, in Claim 5, delete "data processing" and insert -- data-processing --, therefor.

In column 7, line 52, in Claim 7, delete "that that" and insert -- that --, therefor.

In column 9, line 11, in Claim 15, delete "SVL 1" and insert -- SVL1 --, therefor.

Signed and Sealed this
Eighth Day of September, 2015

Michelle K. Lee
*Director of the United States Patent and Trademark Office*